Sept. 4, 1962   M. J. BAUER ETAL   3,052,440
ABSORBER VIBRATION SYSTEM FOR EMPTY MISSILE TRAY
Original Filed Oct. 22, 1959   2 Sheets-Sheet 1
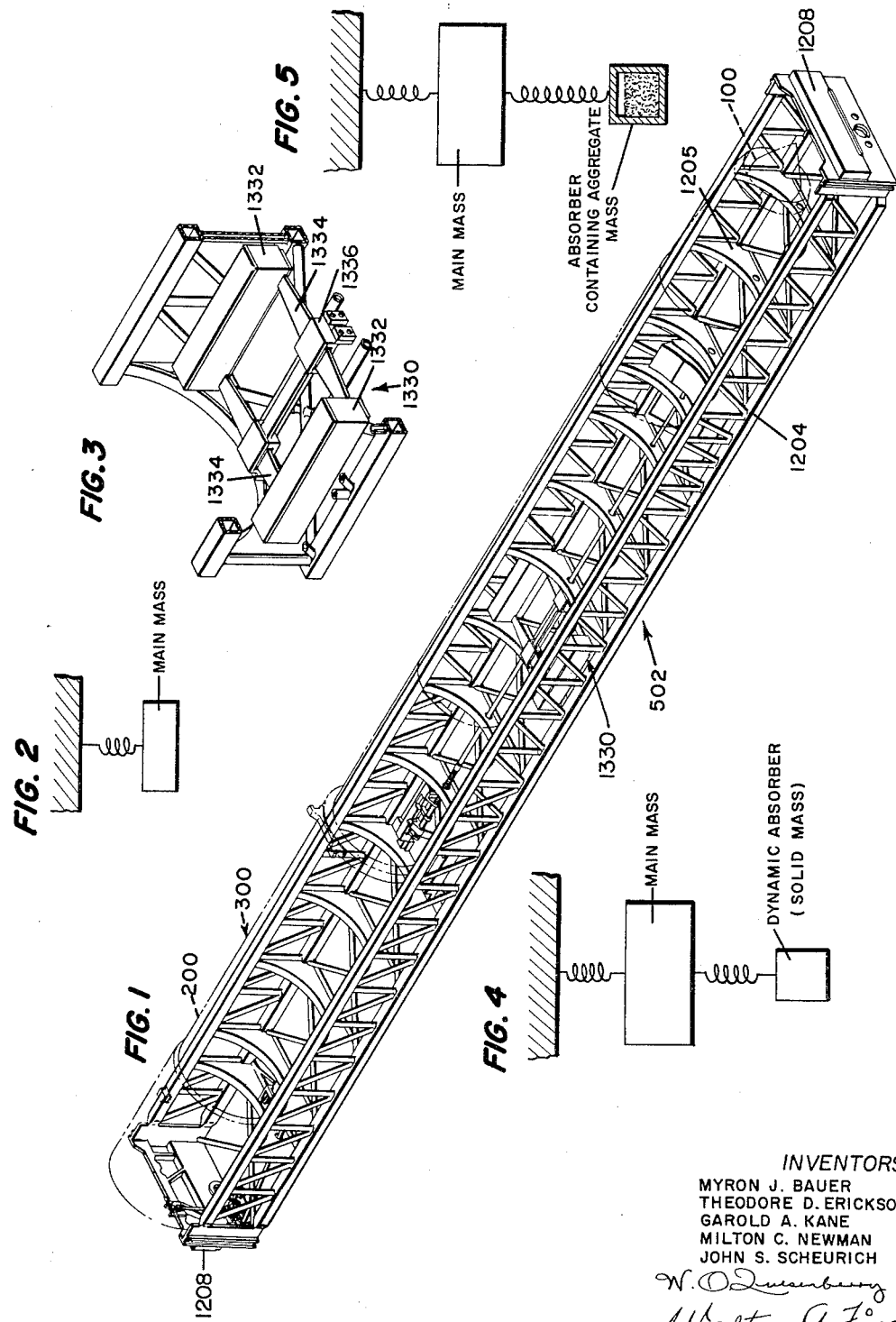
INVENTORS
MYRON J. BAUER
THEODORE D. ERICKSON
GAROLD A. KANE
MILTON C. NEWMAN
JOHN S. SCHEURICH
W. O. Quisenberry
Walter G. Finch
ATTORNEYS

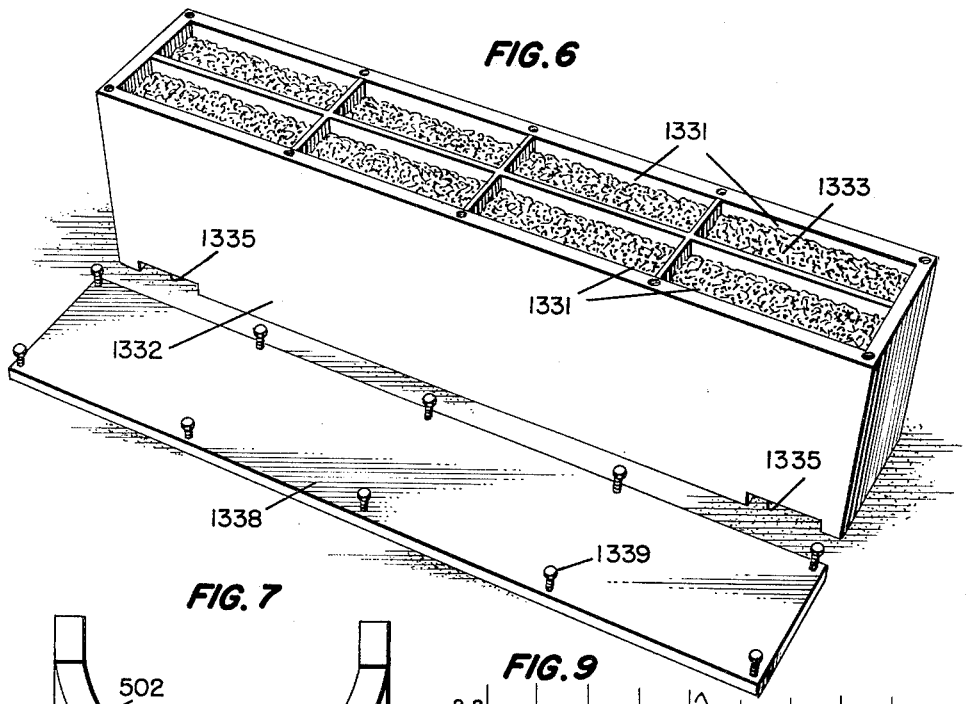
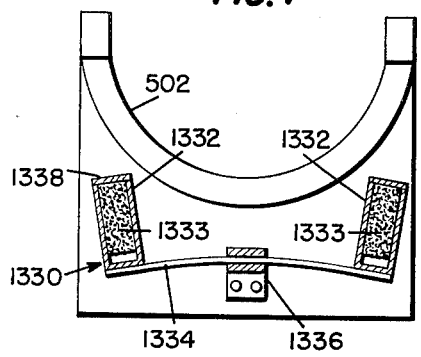
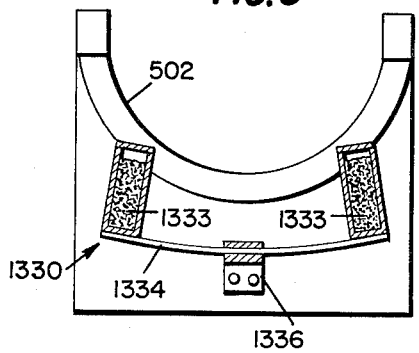
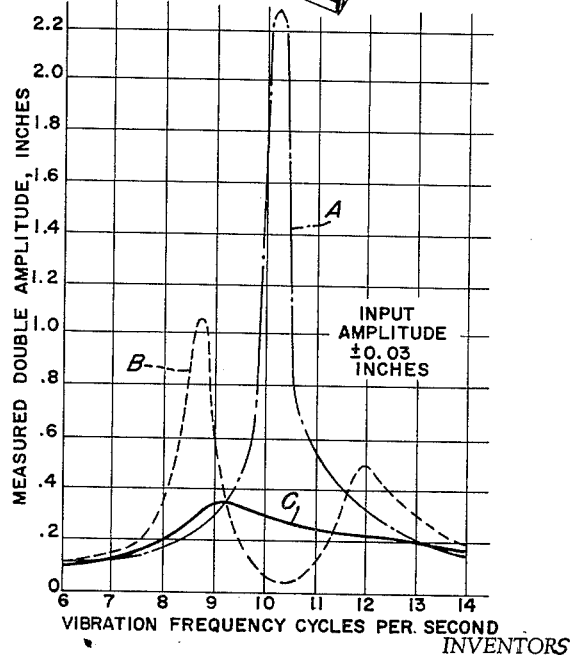

United States Patent Office 3,052,440
Patented Sept. 4, 1962

3,052,440
ABSORBER VIBRATION SYSTEM FOR EMPTY MISSILE TRAY
Myron J. Bauer, St. Paul, Theodore D. Erickson and Garold A. Kane, Minneapolis, Milton C. Neuman, Champlin, and John S. Scheurich, Minneapolis, Minn., assignors, by mesne assignments, to the United States of America as represented by the Secretary of the Navy
Original application Oct. 22, 1959, Ser. No. 848,163. Divided and this application June 13, 1960, Ser. No. 35,852
10 Claims. (Cl. 248—119)

This invention relates generally to article support and storage racks, and more particularly it pertains to a vibration absorber system for an empty tray used for the support and storage of elongated missile-booster combinations.

This patent application is a division of a co-pending U.S. patent application Serial Number 848,163, filed by Myron J. Bauer et al., on October 22, 1959, for "Guided Missile Launching System."

A commonly encountered occurrence, especially on shipboard, is the resonance of some item of structure with the pulsations or vibrations from the engines or propellers of the ship. This occurs most often in elongated structures whose natural frequency of vibration is low corresponding to that from the engines or propeller sources.

A typical situation of this kind is in a weapon handling tray for missile-booster combinations. This tray is supported only at its ends, and is arranged with rollers and tracks so that it may be shuttled and lifted in a ready service mechanism. When empty, the tray is readily resonant excited to a double amplitude of more than two inches. Such vibration of the tray is capable of damage thereto due to pounding at the support tracks, not to speak of the possibility of structural fracture.

Dynamic absorbers can be used to give relief for the tray over a narrow frequency range. The present invention was developed to provide relief for the empty tray over a wide frequency range, and it is used in connection with a dynamic absorber.

An object of this present invention is to provide a compact vibration absorber for elongated structural items, such as empty missile-booster trays, which is effective over a wide range of frequencies.

Another object of this invention is to provide an impact type vibration absorber for empty missile-booster storage and handling trays which can be used effectively to reduce resonant amplitudes sufficiently to eliminate objectionable poundings at the end brackets of the tray.

Still another object of this invention is to provide an impact type vibration absorber for a missile-booster storage tray which utilizes impact principles for absorption of external vibrations which the tray is subjected to.

These and other objects and attendant advantages of this invention will become more readily apparent and understood from the accompanying specification and drawings in which:

FIG. 1 is an isometric view of a tray assembly with dot-dash lines showing a missile-booster combination in place in the tray assembly;

FIG. 2 is a simplified schematic diagram of an elastic structure similar to an elongated tray illustrating the dynamic characteristics thereof;

FIG. 3 is a detailed isometric view, partly in section, of an tempty tray vibration absorber for the tray assembly of FIG. 1;

FIG. 4 is a schematic diagram of a two-mass system illustrating the dynamic characteristics thereof;

FIG. 5 is a schematic diagram of a two-mass system utilizing impact damping and illustrating the dynamic characteristics thereof;

FIG. 6 is a perspective view of a dynamic absorber housing with cover removed showing the interior compartments filled to a predetermined level with aggregate mass;

FIG. 7 is a cross section of an empty tray vibration absorber, in stop-motion, to show the action of aggregate mass in a down stroke thereof;

FIG. 8 is a cross section of the empty tray vibration absorber, in stop-motion, to show the action of aggregate mass in an up stroke thereof; and FIG. 9 is a graphical representation relating vibration frequency to double amplitude of vibration at the center of a typical tray assembly under three different conditions.

Referring first to FIG. 1, there is illustrated a tray 502, of truss structure, for receiving and storing a missile-booster combination 300 (outlined in dot-dash lines) which consists of a missile 100 and a booster 200 held together by a clamping ring (not shown). This tray 502 is described in detail in the previously mentioned patent application, and will be described more briefly subsequently. When the tray 502 is empty, that is, no missile-booster combination 300 is mounted in the tray, it can be considered as a mass distributed uniformly along an elastic beam. For simplicity, however, its dynamic characteristics may be approximated by a system consisting of a concentrated main mas suspended from a fixed support by a massless spring of linear rate as shown in FIG. 2. This equivalent system will be expanded to further the description of the novel vibration absorber.

When a steady alternating force is applied to the simple spring mass system of FIG. 2, obnoxious vibrations will be induced at and near the resonant frequency, as shown in curve A of FIG. 9, which depicts the behavior of an empty undamped tray. It is possible to reduce or eliminate this vibration by suspending another solid mass dynamic absorber on an elastic member from the original system, as shown best in FIG. 4. The system then becomes a two-mass system.

A two-mass system can be shown to be very effective at the natural frequency of a dynamic absorber. At any other frequency, both the main mass and the dynamic absorber will vibrate at amplitudes which are complex functions of their constants. A typical example is shown in curve B of FIG. 9, which illustrates the behavior of an empty tray having a solid mass dynamic absorber. While the 10.25 cycle resonant condition of curve A of FIG. 9 was reduced to almost zero by provision of simple dynamic absorption, a pair of peaks at 8.7 and 12.0 cycles were introduced in curve B of FIG. 9.

It is thus apparent that the utility of the simple two-mass system is restricted to applications involving unvarying frequency of vibration. In order to make it effective over an extended range of frequencies, it is necessary to introduce damping in the vibrating system to decrease the amplitudes of the resonant peaks. With no damping between the main mass and the dynamic absorber, the amplitudes are theoretically infinite. With infinite damping, the amplitude is infinite also. Intermediate values of damping give improved operation, suggesting that an optimum value exists.

In a practical system for a tray, however desirable it is to use a heavy absorber, one of the limiting factors is availability of space. The use of hydraulic damping devices, while quite effective, contribute useless weight and consume space.

In the present invention, it is proposed to combine the functions of damping and a dynamic absorber containing an aggregate mass as illustrated in FIG. 5. This system and method will utilize the impact of an aggregate mass on the top and bottom surfaces of an oscillating spring-suspended container to obtain a damping effect and to provide weight for the dynamic absorber in the same structure.

A system utilizing the impact principle to achieve a damping effect is "amplitude-sensitive." When the absolute acceleration of a container containing the aggregate mass is less than one "G" (acceleration of gravity), the aggregate mass has no movement relative to the container and no damping is achieved. Under such circumstances, the system is simply an undamped dynamic absorber. At accelerations of the dynamic absorber exceeding one "G," however, provided that suitable space is available, the aggregate mass is free to shift inside the container.

During cyclic motion, it is apparent that the shifting aggregate mass will strike the bottom of the container once during each cycle. If the static level of the aggregate mass relative to the top of the container is not excessive, an impact on the top surface will also occur during each cycle. The forces imparted to the container during these impacts constitute the damping effect and are not instantaneous. Because of the nature of an aggregate mass, the effective impact of the container is actually a series of impacts occurring over a finite period of time. This characteristic not only keeps the operation of the container relatively quiet, but it also tends to provide a smooth damping effect.

By judicious selection of parameters, the damping effect achieved by the impact system and method of damping can be made to approximate that of viscous damping. The magnitude of the damping force can be regulated by adjustment of the weight of the aggregate mass relative to the weight of the container. Also, by proper choice of the static level of the aggregate mass relative to the top of the container, the damping effect can be made to approximately coincide cyclically with the maximum effect of viscous damping thereof.

Referring now to the details of the drawings, there is shown in FIG. 1, the previously mentioned tray 502 for receiving the missile-booster combination 300. The tray 502 consists of a truss frame or weldment 1204 formed of four horizontal rails which are joined by tubing. Except for the ends, the tray 502 is of open frame construction braced by spaced crescent-shaped plates 1205 vertically welded within.

When the missile-booster combination 300 is removed from the tray 502, the relatively light elongated tray 502 is subject to undesirable resonant vibration induced through its sole supports, a pair of roller brackets 1208 located at opposite ends thereof.

An empty tray vibration absorber 1330 is mounted within the tray 502 at about its longitudinal center, as shown in FIG. 1. As best illustrated in FIG. 3, the vibration absorber 1330 consists of a pair of rectangular-shaped spaced housings 1332 which are connected and supported by two bonded leaf springs 1334. Each spring 1334, in turn, is centrally anchored to the tray 502 by a mounting bracket 1336.

Each housing 1332, as shown in FIG. 6, is divided into a series of eight internal compartments 1331. Each compartment 1331 contains a mixture 1333 of steel shot and silicone oil evenly distributed therein. The top of the housing 1332 is closed with a cover 1338 which is bolted to the housing 1332 by bolts 1339. The underside of each housing 1332 is provided with recesses 1335 into which the ends of the leaf springs 1334 are secured.

Any vibration of an empty tray 502 is transmitted into the tray vibration absorber 1330. The vibration absorber 1330 counteracts any up and down movement of the tray 502 and tends to neutralize it.

As shown in FIG. 7, the action is somewhat like that of a free piston within each housing 1332. As the spring 1334 is flexed and the housing 1332 moves sharply downwardly, the mixture 1333 of steel shot and silicone oil moves upwardly to contact the cover 1338. In the remaining half of an operational cycle illustrated in FIG. 8, the mixture 1333 of steel shot and silicone oil moves downwardly to impact the bottom of the housing 1332 in a "mushy" delayed contact.

As has been related, the cyclic damping effect is readily obtained by this construction. As shown by curve C of FIG. 9, almost all vibration of the tray 502 is eliminated over a wide range of frequencies.

Obviously many modifications and variations of the present invention are possible in light of the above teachings. It is, therefore, to be understood that within the scope of the appended claims the invention may be practiced otherwise than as specifically described.

What is claimed is:

1. In combination, an elongated shaped tray having a base for use in storage and handling of an elongated shaped article having support elements at each end for supporting said tray at said ends, and a vibration absorber for reducing resonant vibrations introduced in said tray through said end support elements, said vibration absorber consisting of spaced housings each containing an aggregate mass comprising a plurality of elements of mass and located on the opposite sides of the longitudinal axis of said tray and centrally thereof, mounting means secured to the base of said tray centrally of its longitudinal axis, and spring means positioned centrally on said mounting means having arms connecting and freely supporting said housings.

2. In the combination as recited in claim 1, wherein said tray is of truss structure.

3. In the combination as recited in claim 1, wherein said aggregate mass is free to move upwardly as well as downwardly.

4. In the combination as recited in claim 3, wherein said aggregate mass consists of a mixture of metal shots and a medium viscosity liquid.

5. In combination, a long elastic beam structure for use in storage and handling of an elongated shaped article having elements at each end for supporting said beam at said ends, and means mechanically coupled to said elastic beam structure for reducing resonant vibrations which said elastic beam structure is subjected to through said end support elements when said elastic beam structure is not being utilized for storage of an article, said mechanically coupled means comprising housings each containing a plurality of steel shot and located on opposite sides of the longitudinal axis of said elastic beam structure and centrally thereof, a mount secured to the base of said elastic beam structure centrally of its longitudinal axis and a leaf type spring device positioned centrally on said mount connecting and freely supporting said housings with respect to said elastic beam structure.

6. In a device for absorbing resonant vibrations introduced in an unloaded elongated tray for storing and handling elongated articles, the combination comprising: an elongated elastic beam structure having two ends, support means connected to and supporting each end of said beam structure, absorbing means operably connected to said beam structure at the center of its longtudinal axis for absorbing resonant vibrations in said beam, said absorbing means comprising at least one pair of spaced housings each containing an aggregate mass, said spaced housings being supported in spaced relation centrally of the longitudinal axis of said beam structure, mounting means attached centrally on the longitudinal axis of said beam structure, and spring means fixedly connected to said mounting means, said spring means having arms connecting and supporting said spaced housings centrally of the longitudinal axis of said elongated beam structure.

7. The combination as recited in claim 6 wherein said aggregate mass is free to move upwardly as well as downwardly.

8. The combination as recited in claim 6 wherein each of said spaced housings comprises at least one row of a plurality of compartments for containing said aggregate mass.

9. The combination as recited in claim 8 wherein said aggregate mass in each housing comprises a mixture of oil and metal shot.

10. The combination as recited in claim 6 wherein said spring is a leaf spring.

References Cited in the file of this patent

UNITED STATES PATENTS

| | | |
|---|---|---|
| 1,773,659 | Austin | Aug. 19, 1930 |
| 1,792,493 | Hallett | Feb. 17, 1931 |
| 2,366,337 | Kreuter et al. | Jan. 2, 1945 |
| 2,521,088 | Phelps | Sept. 5, 1950 |
| 2,546,651 | O'Connor | Mar. 27, 1951 |
| 2,736,393 | O'Connor | Feb. 28, 1956 |